Feb. 20, 1923.

C. W. HOWE.
WORK HOLDING AND EJECTING MECHANISM.
FILED MAY 13, 1921.

Inventor.
C. Warren Howe
by J. K. McCurdy
his Atty.

Feb. 20, 1923.
C. W. HOWE.
WORK HOLDING AND EJECTING MECHANISM.
FILED MAY 13, 1921.

Inventor.
C. Warren Howe.
by J. H. McCrady
his Atty.

Patented Feb. 20, 1923.

1,446,305

UNITED STATES PATENT OFFICE.

CHARLES WARREN HOWE, OF LOWELL, MASSACHUSETTS, ASSIGNOR TO SACO-LOWELL SHOPS, OF BOSTON, MASSACHUSETTS, A CORPORATION OF MASSACHUSETTS.

WORK HOLDING AND EJECTING MECHANISM.

Application filed May 13, 1921. Serial No. 469,354.

*To all whom it may concern:*

Be it known that I, CHARLES WARREN HOWE, a citizen of the United States, residing at Lowell, in the county of Middlesex and State of Massachusetts, have invented certain new and useful Improvements in Work Holding and Ejecting Mechanisms, of which the following is a specification.

This invention relates to chucks, mandrels, and other work holding devices, hereinafter referred to as mandrels, and to mechanisms for removing or ejecting the work from such devices.

It is the chief object of the invention to improve work holding devices of the character just mentioned with a view to facilitating the machining operations and reducing manufacturing costs, both on the devices themselves and also on the pieces of work with which they are used. The invention also aims to devise a work ejecting mechanism for such devices which will save time and labor on the part of the workman, and will effectually perform the ejecting operation without danger of damaging the work.

The invention will be herein disclosed as embodied in a mechanism designed especially for use in the machining of the pulleys or whorls for spindles of the character used in the textile industries, although it will readily be appreciated that the invention is equally applicable to many other uses.

Whorls of this character have usually been machined heretofore by boring and reaming a tapered hole in the casting or blank for the whorl and then driving the casting on to a tapered mandrel and turning the belt receiving surface with a special forming tool or cutter. The casting must be stuck very hard on the mandrel in order to prevent it from turning around, and consequently, a great deal of force is required to eject it from the tapered mandrel when the machining operation has been completed. If this ejecting operation is performed by hand there is great liability of breaking the whorl and thus ruining a piece of work on which considerable labor has already been expended.

The present invention provides an ejecting mechanism which effectually solves this problem, and it also provides a mandrel construction which is of particular utility where a variety of sizes and styles of work having the same general characteristics are to be machined.

The nature of the invention will be readily understood from the following description when read in connection with the accompanying drawings, and the novel features will be particularly pointed out in the appended claims.

Referring now to the drawings.

Figure 1:
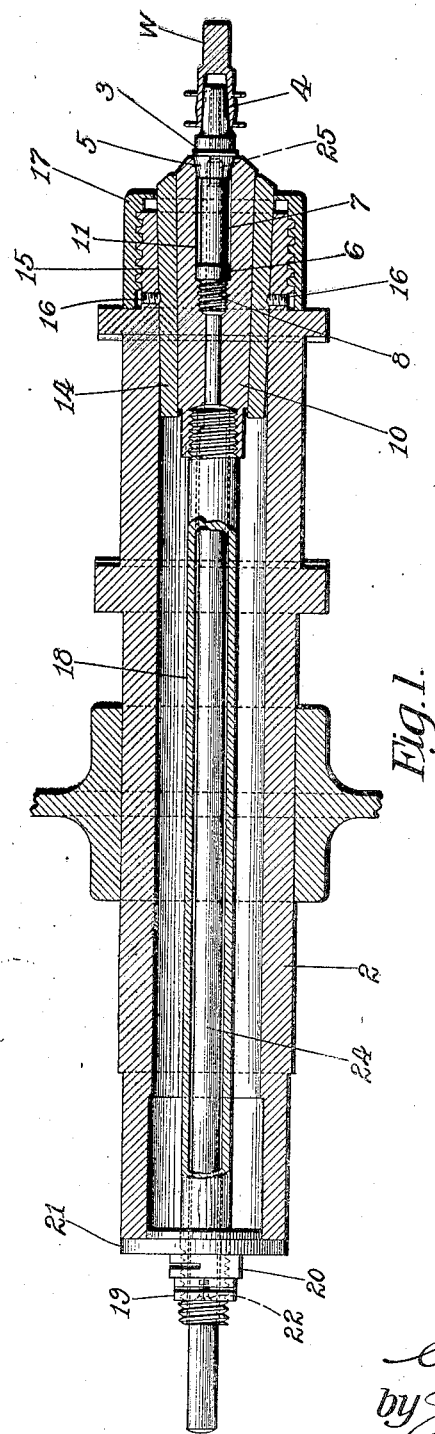
Figure 1 is a longitudinal cross sectional view of a machine head stock or shaft equipped with a mandrel and an ejector embodying the present invention.

The construction shown comprises a hollow shaft or head stock 2 like that used in lathes and other machine tools, this shaft being mounted in suitable bearings and being driven by appropriate gearing. The supporting and driving mechanism for the shaft 2, however, has not been illustrated since it is not essential to an understanding of the present invention. Mounted in the forward end of the shaft 2 is a mandrel 3 having a tapered nipple or work holding portion 4 to receive the work W. In this instance, as above stated, the work consists of a whorl or pulley which, when completed, will be mounted on a spinning, twisting, or roving machine spindle or similar device.

The mandrel 3 has a shank which includes a tapered part 5 adjacent to the work holding portion 4, a cylindrical part 6 which is separated from the tapered portion 5 by a reduced part 7, and a threaded end portion 8. This mandrel is mounted in a body 10 having a recess or bore 11 in which the cylindrical part 6 of the mandrel fits snugly. The outer portion of this bore is tapered to receive the tapered portion 5 of the mandrel and the inner part of the bore is threaded to receive the threaded end 8 of the mandrel. The cylindrical and tapered surfaces 5 and 6 of the mandrel, and the cooperating surfaces of the body 10, are ground so that they will fit very accurately. When the mandrel is inserted in the body 10 the part 8 is threaded into its cooperating part in the body until the tapered part 5 of the mandrel brings up firmly against its seat in the body 10. Since the surfaces 5 and 6 fit snugly in their seats a true mounting of the mandrel in the body is ensured.

The outer surface of the body 10 is ground to a taper which fits a correspondingly tapered internal surface in a sleeve 14, the outer surface of this sleeve also being ground to fit an internal tapered surface 15 formed in the end portion of the hollow shaft 2. Small studs 16—16 are threaded radially through the wall of the shaft 2 and have their ends seated in sockets formed for them in the sleeve 14 where they effectually prevent any accidental outward movement of the sleeve. Usually the end portion of the shaft or head stock 2 is threaded externally to receive an adjustable chuck, and in order to protect these threads a cap 17 is threaded on to this portion of the shaft.

For the purpose of holding the body 10 securely in its operative position it is internally threaded at its inner end to receive the threaded end of a tube 18 that extends through the shaft and has nuts 19 and 20 threaded on its outer end, these nuts bearing against a shouldered washer 21 fitting against the rearward end of the shaft 2. By turning these nuts in the proper direction the body 10 may be drawn firmly into its seat in the sleeve 14. Each of these nuts is split and a screw 22 is threaded in the split portions to force them toward each other and thus to exert a friction on the threads which will prevent the nuts from accidentally backing off.

It will be observed that the mandrel 3 and body 10 are drilled centrally to receive an ejector. This ejector comprises a rod 24 fitting loosely within the tube 18 and having a reduced portion or tip 25 that normally lies within the bore of the mandrel 3 and body 10.

Figure 2:
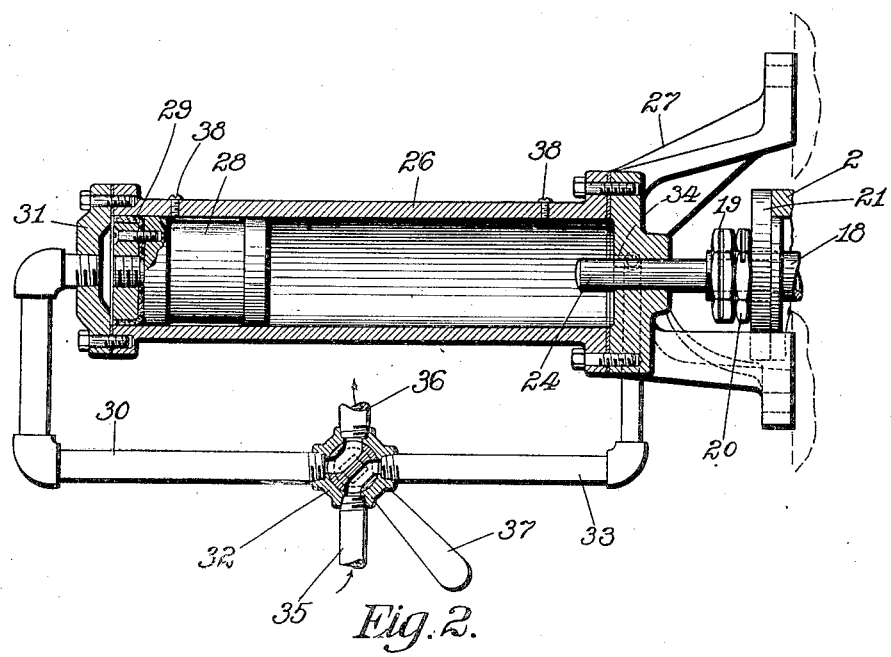
Fig. 2 is a view, partly in side elevation and partly in cross section, showing the ejector operating mechanism and the controlling means for the ejector.

A pneumatic mechanism is provided to operate this ejector, and this mechanism includes a cylinder 26, Fig. 2, having a base 27 that is bolted to the machine frame at the rearward end of the shaft 2. A plunger or piston 28 is slidably mounted in the cylinder 26 and is provided with a suitable packing 29 to prevent leakage between it and the cylinder walls. Compressed air may be admitted to the cylinder either through a pipe connection 30 leading from the cylinder head 31 to a three-way valve 32, or through another pipe connection 33 leading from the valve 32 into an inlet duct 34 formed in the cylinder base 27. A supply pipe 35 leads compressed air to the valve 32 from any suitable source and the exhaust air is discharged through another pipe 36 also connected to the valve. The valve is operated manually by means of a handle 37. For the purpose of lubricating the inner walls of the cylinder, screws 38—38 are tapped through the walls so that they may be removed and a small quantity of oil introduced into the cylinder when desired.

In using the mechanism the casting for the whorl W, which has been bored and reamed to the desired diameter and taper, is driven on to the tapered nipple 4 of the mandrel, as shown in Fig. 1. The belt receiving surface and flanges of this whorl are then turned by a suitable tool or tools while the whorl is supported in this manner. At the completion of this operation the workman moves the handle 37 of the valve 32 into a position to admit compressed air to the left-hand end of the cylinder 26, and the air so admitted forces the plunger or piston 28 toward the right-hand end of the cylinder, causing the plunger to strike the ejector 24 with sufficient force to drive the tip 25 of the ejector against the inner end of the whorl W and force it off the mandrel. Usually the workman catches the whorl with his hand as it is ejected. This ejecting operation occupies but an instant and requires relatively little effort on the part of the workman.

As soon as the ejecting operation has been performed the workman shifts the valve into the position shown in Fig. 2, in which it admits compressed air to the right-hand end of the cylinder, thus forcing the piston 28 back into its original position, this position of the valve also releasing the air from the left-hand end of the cylinder. The valve is then moved to its neutral position. The workman next pushes the tip 25 of the ejector, the end of which at this time is projecting out of the mandrel, back into its original position and drives another piece of work on to the mandrel in readiness for the next machining operation.

It will now be appreciated that this invention not only relieves the workman of the labor of ejecting the work from the mandrel, but that it also reduces the liability of breaking the machined parts since the apparatus is designed to give just the force required to ensure the removal of the work from the mandrel. It will also be evident that in order to accommodate another size of whorl or other piece of work, it is merely necessary to remove the mandrel 3 and replace it with another mandrel having a nipple 4 or other work receiving portion of the proper size and shape to hold the new piece of work, the other parts of the mandrel, however, being duplicates of that shown.

Figure 3:
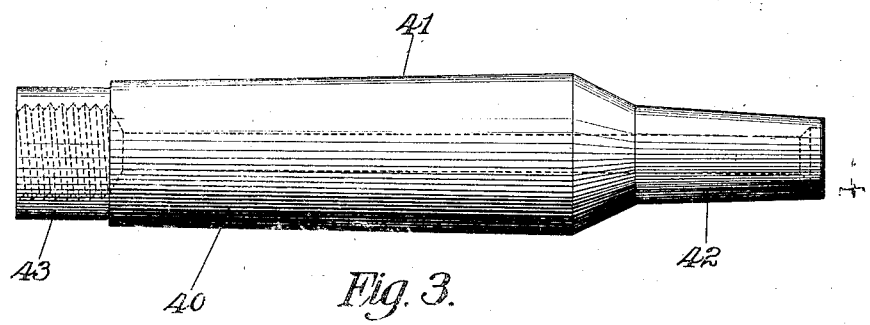
Fig. 3 is a side elevation of another form of mandrel.

In order to accommodate larger pieces of work than those for which the mandrel 3 is adapted, the mandrel and its body 10 may be removed and replaced by a mandrel of the general character of that shown at 40 in Fig. 3. This mandrel has an outer surface 41 tapered to fit the inner surface of the sleeve 14, a tapered nipple 42 to receive the work, and an internally threaded part 43 to receive the threaded end of the tube 18. The mandrel is also drilled centrally to receive the ejector tip and it is secured in the shaft 2 in the same way that the body 10 is secured in its operative position. Mandrels of this construction are, however, more expensive to manufacture than are the mandrels 3. If the nipple or work holding part is very small the danger of this part breaking off at a point close to its base is much greater in mandrels of the type shown in Fig. 3 than those of the construction shown in Fig. 1. That is, these mandrels are hardened, and in case there is a great difference in size between the nipple and the shank or body of the mandrel the nipples usually are relatively brittle and consequently break easily. In manufacturing some parts, however, mandrels of the type shown in Fig. 3 are preferable.

While I have herein shown and described the best embodiment of the invention of which I am at present aware, it will readily be appreciated that this embodiment may be modified in many particulars without departing from the spirit or scope of this invention.

What is claimed as new is:

1. A mechanism of the character described comprising, in combination, a hollow rotary shaft, a hollow work holding mandrel mounted on one end of said shaft, an ejector for removing work from said mandrel, said ejector comprising a rod mounted to slide within said mandrel, pneumatic mechanism for forcing said rod against the work to remove it from the mandrel, and means for controlling the operation of said pneumatic mechanism.

2. A mechanism of the character described comprising, in combination, a work holding mandrel, a slidable ejector for removing the work from said mandrel, a slidable plunger for striking said ejector and operating it, and means for controlling the operation of said plunger.

3. A mechanism of the character described comprising, in combination, a work holding mandrel, a slidable ejector for removing the work from said mandrel, pneumatic means for operating said ejector, and a manually operated device for controlling the operation of said ejector.

4. A mechanism of the character described comprising, in combination, a rotary shaft, a mandrel mounted on one end of said shaft, an ejector for removing work from said mandrel, said ejector comprising a rod extending through said shaft, a cylinder mounted adjacent to the rearward end of the shaft, and a plunger in said cylinder for striking said rod to operate said ejector.

5. A mechanism of the character described comprising, in combination, a rotary shaft, a mandrel mounted on one end of said shaft, an ejector for removing work from said mandrel, said ejector comprising a rod extending through said shaft, a cylinder mounted adjacent to the rearward end of the shaft, a plunger in said cylinder for striking said rod, and pneumatic means for operating said plunger.

6. A mechanism of the character described comprising, in combination, a rotary shaft, a hollow work-holding mandrel mounted on one end of said shaft, and a pneumatically operated ejector mounted in said shaft and operative to eject the work from the mandrel.

7. A mechanism of the character described comprising, in combination, a rotary shaft, a mandrel having a work holding portion and a shank including a tapered surface adjacent to the work holding portion thereof and a cylindrical surface near the rearward end of said shank, a body member having a recess therein shaped to receive said tapered and cylindrical parts, the outer surface of said body member being tapered, and a tapered sleeve mounted in the end of said shaft, the tapered surface of said body member fitting within said sleeve.

8. A mechanism of the character described comprising, in combination, a rotary shaft, a mandrel mounted on one end of said shaft, said mandrel having a shank and means for supporting said mandrel comprising a member having a recess therein to receive the shank of the mandrel, said shank having a part threaded into said member and having a cylindrical surface near its rearward end and a tapered surface adjacent to the work holding portion thereof, and said member having surfaces to receive said tapered and cylindrical parts.

9. A mechanism of the character described comprising, in combination, a rotary shaft, a mandrel having a work holding portion and a tapered shank, an internally tapered member secured to said shaft and in which said shank is mounted, and threaded means for forcing said shank into the tapered seat in said member.

10. A mechanism of the character described comprising, in combination, a hollow rotary shaft, a mandrel having a work holding portion and a tapered shank, a part rotating with said shaft and having a tapered seat to receive said tapered shank, a tube in said shaft connected with said shank, and threaded means cooperating with said shaft and tube to draw said tapered shank firmly into said seat.

11. A mechanism of the character described comprising, in combination, a hollow rotary shaft, a hollow mandrel having a tapered nipple to receive the work and having a shank provided with a tapered surface, an internally tapered member in which said shank is mounted, said member being secured in the end portion of said shaft, an ejector rod having a portion arranged to be projected through said mandrel to eject the work therefrom, and pneumatic mechanism for operating said rod.

12. A mechanism of the character described comprising, in combination, a hollow rotary shaft, a hollow mandrel having a tapered work holding nipple and a shank provided with a tapered surface adjacent to said nipple, a threaded rearward end and a cylindrical surface adjacent to said end, a body member having an external tapered surface and having a recess therein to receive said tapered, threaded and cylindrical parts of said shank, and a part rotating with said shaft having an internal tapered surface to receive the external surface of said body.

13. A mechanism of the character described comprising, in combination, a rotary shaft, a hollow mandrel having a tapered work holding surface and a shank provided with a tapered portion, a member secured to said shaft for rotation therewith, said member having an internally tapered seat in which said shank is mounted, threaded means at the inner end of said shank for forcing said shank into said tapered seat, and an ejector rod slidable in said mandrel to remove the work therefrom.

14. A mechanism of the character described comprising, in combination, a hollow rotary shaft, a hollow mandrel having a tapered work holding nipple and a shank including a tapered portion, a body member having an external tapered surface and an internal tapered seat in which seat said tapered shank is mounted, threaded means at the inner end of said shank for drawing said mandrel firmly into its seat, a sleeve mounted in the end of said shaft, and having an internal tapered seat in which the external surface of said body member fits, an ejector comprising a rod mounted to slide within the mandrel, and pneumatic means for forcing said rod against the work to remove the same from the mandrel.

15. A mechanism of the character described comprising, in combination, a hollow rotary shaft, a hollow mandrel having a tapered work holding nipple and a shank including a tapered portion, a body member having an internal tapered seat in which seat said tapered shank is mounted, the inner end portion of said shank being threaded into said body, and means for securing said body member in the end of said shaft.

CHARLES WARREN HOWE.